(12) United States Patent
Zhu

(10) Patent No.: US 11,325,679 B2
(45) Date of Patent: May 10, 2022

(54) BOAT HULL WITH MOUNTING TRACK SYSTEMS

(71) Applicant: Bingstar Marine Group Pty Ltd, Baulkham Hills (AU)

(72) Inventor: Min Zhu, Baulkham Hills (AU)

(73) Assignee: Bingstar Marine Group Pty Ltd, Baulkham Hills (AU)

( * ) Notice: Subject to any disclaimer, the term of this patent is extended or adjusted under 35 U.S.C. 154(b) by 0 days.

(21) Appl. No.: 17/054,403

(22) PCT Filed: May 10, 2018

(86) PCT No.: PCT/AU2018/050435
§ 371 (c)(1),
(2) Date: Nov. 10, 2020

(87) PCT Pub. No.: WO2019/213684
PCT Pub. Date: Nov. 14, 2019

(65) Prior Publication Data
US 2021/0070398 A1    Mar. 11, 2021

(51) Int. Cl.
*B63B 3/36*        (2006.01)
*B63B 73/43*       (2020.01)
(Continued)

(52) U.S. Cl.
CPC .................. *B63B 3/36* (2013.01); *B63B 3/70* (2013.01); *B63B 73/43* (2020.01); *F16B 5/0685* (2013.01);
(Continued)

(58) Field of Classification Search
CPC ........... B63B 3/36; B63B 3/70; B63B 29/025; B63B 2029/027; B63B 73/43; B63B 2221/00; B63B 2231/20; B63B 69/00; B63B 17/00; B63B 2017/0054; F16B 5/0685; F16B 37/045; F16B 2200/503
(Continued)

(56) References Cited

U.S. PATENT DOCUMENTS 4,214,332 A      7/1980  Stoner
6,640,737 B2 *  11/2003  Chacon .................. B63B 1/121
                                                      114/354
(Continued)

OTHER PUBLICATIONS

International Search Report for PCT/AU2018/050435, 3 sheets, dated Jan. 2015.

*Primary Examiner* — Daniel V Venne
(74) *Attorney, Agent, or Firm* — Banner & Witcoff, Ltd.

(57) ABSTRACT

A boat hull has one or more track systems integral with a main body of the boat hull, each track system having a longitudinally extending channel comprising: a longitudinally extending channel body; and a longitudinally extending channel opening in communication with the channel body, wherein the channel body is wider in cross-section than the channel opening, the channel body is adapted to receive a fastener which has a portion that is wider in cross section than the channel opening, thereby preventing the fastener from being withdrawn from the channel body through the channel opening, and wherein the fastener can be selectively secured to the track system at a selected longitudinal position. The track systems can be used for mounting boat hull structural parts and other parts and accessories.

13 Claims, 14 Drawing Sheets

(51) Int. Cl.
  *B63B 3/70* (2006.01)
  *F16B 5/06* (2006.01)
  *F16B 37/04* (2006.01)
(52) U.S. Cl.
  CPC ...... *F16B 37/045* (2013.01); *F16B 2200/503* (2018.08)
(58) Field of Classification Search
  USPC .......................................... 114/343, 355, 364
  See application file for complete search history.

(56) References Cited

U.S. PATENT DOCUMENTS

| | | |
|---|---|---|
| 7,341,231 B2 | 3/2008 | Zarn |
| 8,070,378 B2 | 12/2011 | Gargaro, III et al. |
| 10,124,869 B1 * | 11/2018 | Bailey .................... B63B 34/56 |
| 2005/0000675 A1 | 3/2005 | Zarn |
| 2010/0015860 A1 | 6/2010 | Gargaro, III et al. |

* cited by examiner

BOAT HULL WITH MOUNTING TRACK SYSTEMS

TECHNICAL FIELD

The application is a U.S. National Phase Entry of International Application No. PCT/AU2018/050435 filed on May 10, 2018, designating all states including the United States of America. For all purposes, the disclosure of which are incorporated herein by reference in their entireties as part of the present application.

BACKGROUND OF THE INVENTION

In conventional methods for construction of steel or aluminium boats, internal fit-outs and various additional parts are built into the boat by welding processes to form the internal layouts. Glass reinforced boats can be constructed using superstructural mould or by integrating the parts into the boat hull by Glass Reinforced Plastic (GRP) mould lamination processes. Alternatively, additional parts can be secured onto the boat hull with fasteners, or glued onto the boat hull by applying structural adhesives. All of these processes provide boat hulls with permanently or semi-permanently attached boat structure accessory parts.

However, these conventional methods are inadequate for accommodating needs for different internal layouts and parts for boats as well as needs for reconfiguring the layouts after the construction of boats. With the conventional methods, the costs for changing the layout design is significant, and providing a custom-built boat to suit a customer's needs is extremely costly. In addition, modification to the integrated boat hull after the initial construction could compromise the structural integrity of the boat.

Instead of building boat hulls with integrated accessories, universal accessories such as Bimini tops, antennas, fish cutting boards, lights, ski poles are often drilled onto structural members of the boat hull to securely install the accessories onto the boat. However, drilling accessories onto structural members of a boat hull could also compromise the structural integrity of the boat hull, or still worse, water tightness of the boat.

OBJECT OF THE INVENTION

It is an object of the present invention to substantially overcome or at least ameliorate one or more of the above disadvantages, or to provide a useful alternative.

SUMMARY OF THE INVENTION

In a first aspect, the present invention provides a boat hull having one or more track systems integral with a main body of the boat hull, each track system having a longitudinally extending channel comprising:
  a longitudinally extending channel body; and
  a longitudinally extending channel opening in communication with the channel body,
wherein the channel body is wider in cross-section than the channel opening,
wherein the channel body is adapted to receive a fastener which has a portion that is wider in cross section than the channel opening, thereby preventing the fastener from being withdrawn from the channel body through the channel opening, and
wherein the fastener can be selectively secured to the track system at a selected longitudinal position.

In a preferred embodiment, the track system is integral with one or more gunwale members of the main body of the boat hull. Still preferably, the one or more track systems extend along the one or more gunwale members and the corresponding channel opening opens upwards, sideways towards an inside of the boat hull, sideways towards an outside of the boat hull, and/or downwards. Still preferably, the boat hull has two or more track systems integral with one said gunwale member and has the corresponding channel openings opening towards different directions and adapted to each receive a fastener to secure an accessory to the boat hull. Preferably, each said track system is welded or fastened onto a corresponding gunwale member.

In a preferred embodiment, the track system is integral with one or more of a keel, chines and bottom ribs of the main body of the boat hull. Preferably, the channel opening of the track system opens towards an inside space of the boat hull. Preferably, the track system is integrally formed with said one or more of the keel, chines and ribs. Still preferably, the keel, the chines, the side ribs and the bottom ribs is welded with or fastened onto plates forming the main body of the boat hull.

In a preferred embodiment, each said channel body has a cross-sectional profile general in the form of an isosceles trapezoid, a short side of two parallel sides of the trapezoid defining the channel opening. Preferably, each said channel body has a rectangular groove into a longer side of the two parallel sides of the trapezoid.

In a preferred embodiment, each said track system has an engagement mechanism adapted to be selectively isolated longitudinally relative to the channel. Preferably, the engagement mechanism comprises a channel nut adapted to be located in the channel body and to slide along the channel without coming out through the channel opening, the channel nut having a threaded hole adapted to receive a bolt to extend through the channel opening such that the channel nut and the bolt function as the fastener. Alternatively, the engagement mechanism comprises a plow bolt having a head portion and a threaded stem portion, wherein the head portion is adapted to be located in the channel body and to slide along the channel without coming out through the channel opening, and the threaded stem portion is adapted to extend through the channel opening to engage with a nut to act as the fastener.

An embodiment of the boat hull with track systems described herein can improve flexibility of internal layout arrangement of boats, reduce the requirement for permanently welded or moulded parts, and enhance capability for future parts/accessories mounting after initial manufacture without compromising the structural integrity of the boat hull.

BRIEF DESCRIPTION OF THE DRAWINGS

A preferred embodiment of the invention will now be described by way of specific example with reference to the accompanying drawings, in which.

DETAILED DESCRIPTION OF THE PREFERRED EMBODIMENTS

Figure 1:
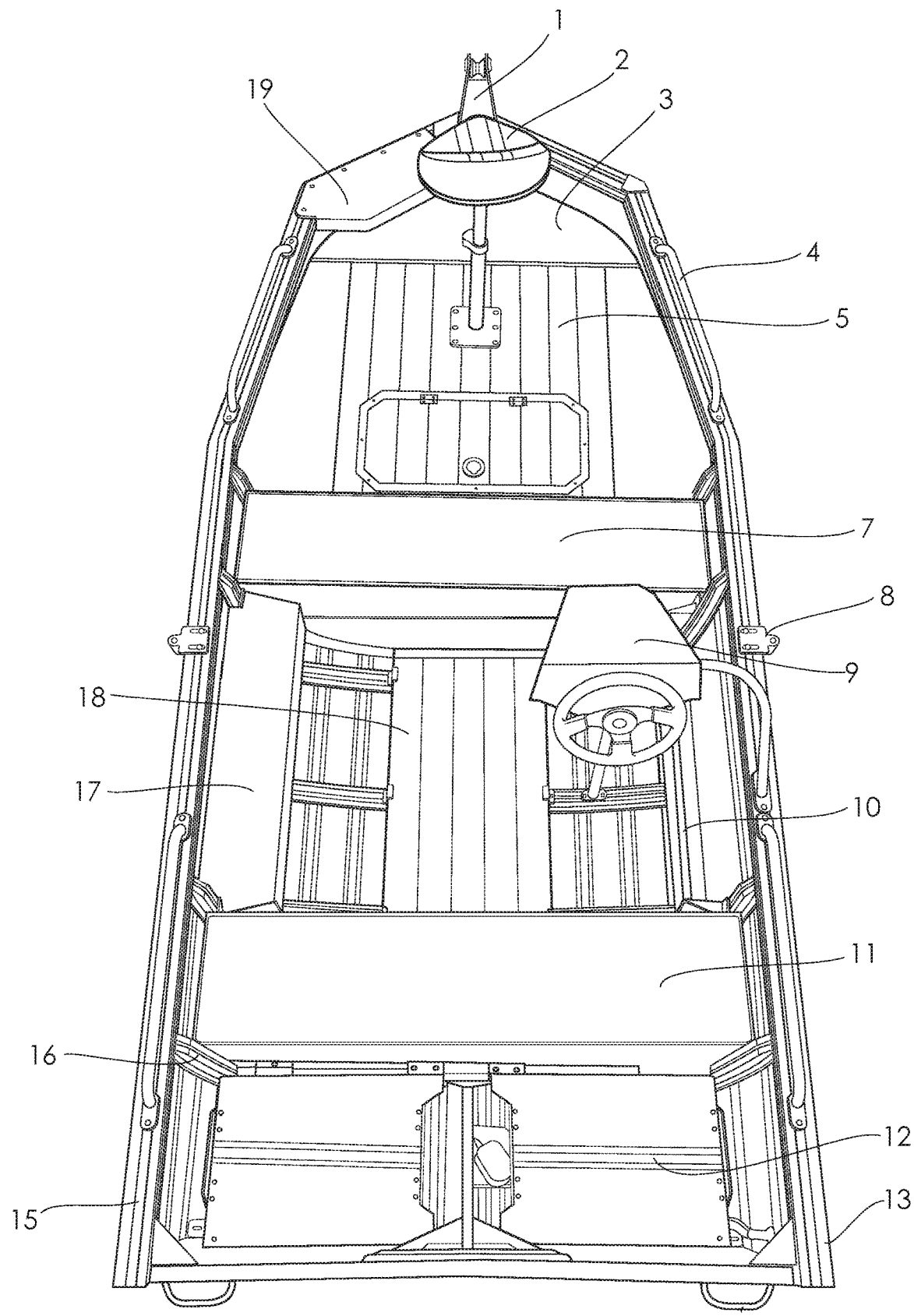
FIG. 1 is a perspective view of a boat hull in an embodiment of the invention, including internal fit-outs and various accessories.
Figure 2:
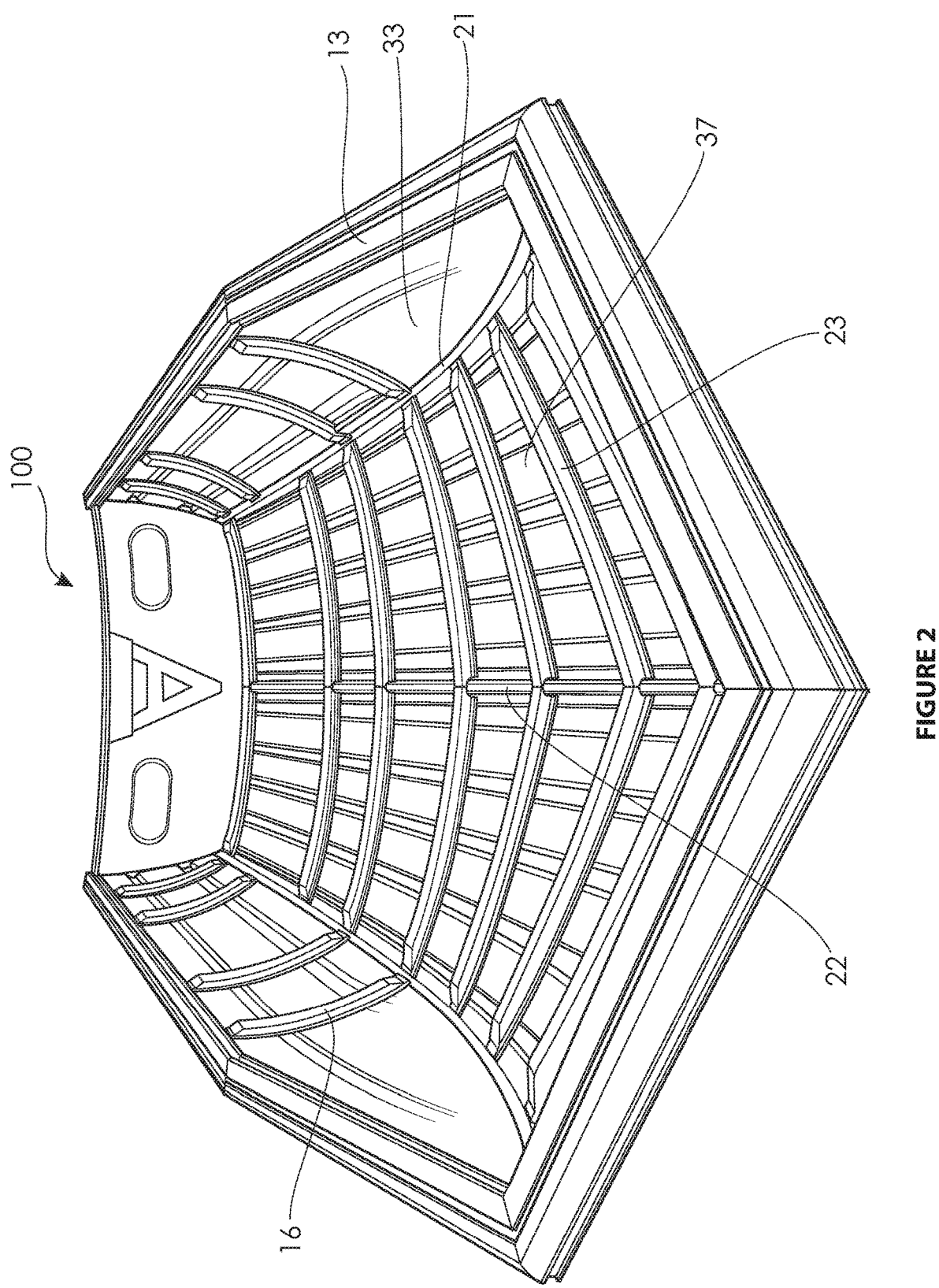
FIG. 2 is a perspective view showing typical components of a boat hull.

FIG. 1 shows a boat hull in an embodiment of the invention with various accessories and add-on components mounted onto the boat hull via track systems 29, 30, 31, 34, 38, 41. FIG. 2 shows typical components of a boat. FIGS. 3 to 9 and 18 to 21 illustrate the details of the track systems. FIGS. 10 to 17 illustrate examples of utilising the track systems to mount various add-on components onto the boat hull.

As shown in FIG. 2, a main body of a boat hull 100 comprises a keel 22 that extends longitudinally along the length of the boat hull 100, lower plates 37 extending on either side of the keel 22 and forming the bottom of the boat hull 100, and upper plates 33 forming the sides of the boat hull 100. Chines 21 define the lines at which the incline of the hull shape changes, and can be located between and connect the lower plates 37 and the upper plates 33. Gunwales 13 are the top edges of the boat hull, and can be on the sides as well as to the front and the back of the boat. The boat hull also has ribs such as side ribs 16 and bottom ribs 23. The track system in an embodiment of the invention can be integrated into various components of the boat hull, including the gunwales 13, chines 21, keel 22, side ribs 16 and bottom ribs 23.

Using the track system, various accessories can be mounted onto the boat hull to construct a boat such as shown in FIG. 1. Components such as a bowsprit 1, pedestal seat set 2 on a bow deck 3 or a fore deck 5, handrails 4, a row lock socket 8 and boat bow trolley motor bracket 19 can be installed using track systems integrated with the gunwale 13. Track systems integrated with the bottom ribs 23 can be used to install components such as a floor deck 18 and a fuel/battery stand 12. Track systems integrated with the side ribs 16 and/or the chine 21 can be used to install side storage pockets 10, 17. Track systems integrated with the side ribs 16 and/or the chine 21 can be used to install a forward thwart seat 7 and a rear thwart seat 11. Some components such as a steering console 9 can be installed using track systems on different parts of the boat hull such as the gunwale 13 and bottom rib 23. The track system integrated with the keel 22 and/or the bottom ribs 23 can be used to install a floor deck 18. The channels in the track systems can be covered using rubber insert strips 15 to improve the appearance and for easy maintenance.

The hull can be full welded by jointing the upper plates 33 with the lower plates 37 together via the chines 21 and the keel 22, and the upper plates 33 with the gunwales 13. The ends of the ribs 16, 23 can be welded onto the chines 21, keel 22 and gunwales 13 to form the skeleton of the boat. The ribs 16, 23 can also be welded with the plates 33 forming the main body of the boat hull. The gunwales 13, chines 21 and keel 22 can provide integrated longitudinal track systems and the ribs 16, 23 can be used to provide integrated transverse direction track systems. The boat hull can generally be fabricated from aluminium, but can also be fabricated from other materials. The components of the boat hull, that is, the plates 33, 37, chines 21, keel 22, gunwales 13 and ribs 16, 23 can also be assembled in different manners, such as by fastening the components together. The gunwales 13, chines 21, keel 22, and ribs 16, 23 with integrated track systems can be manufactured from aluminium or other materials by extrusion processes. Alternatively, track systems can be manufactured separately from the gunwales 13, chines 21, keel 22, and ribs 16, 23 and then welded or fastened onto the gunwales 13, chines 21, keel 22, and ribs 16, 23.

Figure 7:
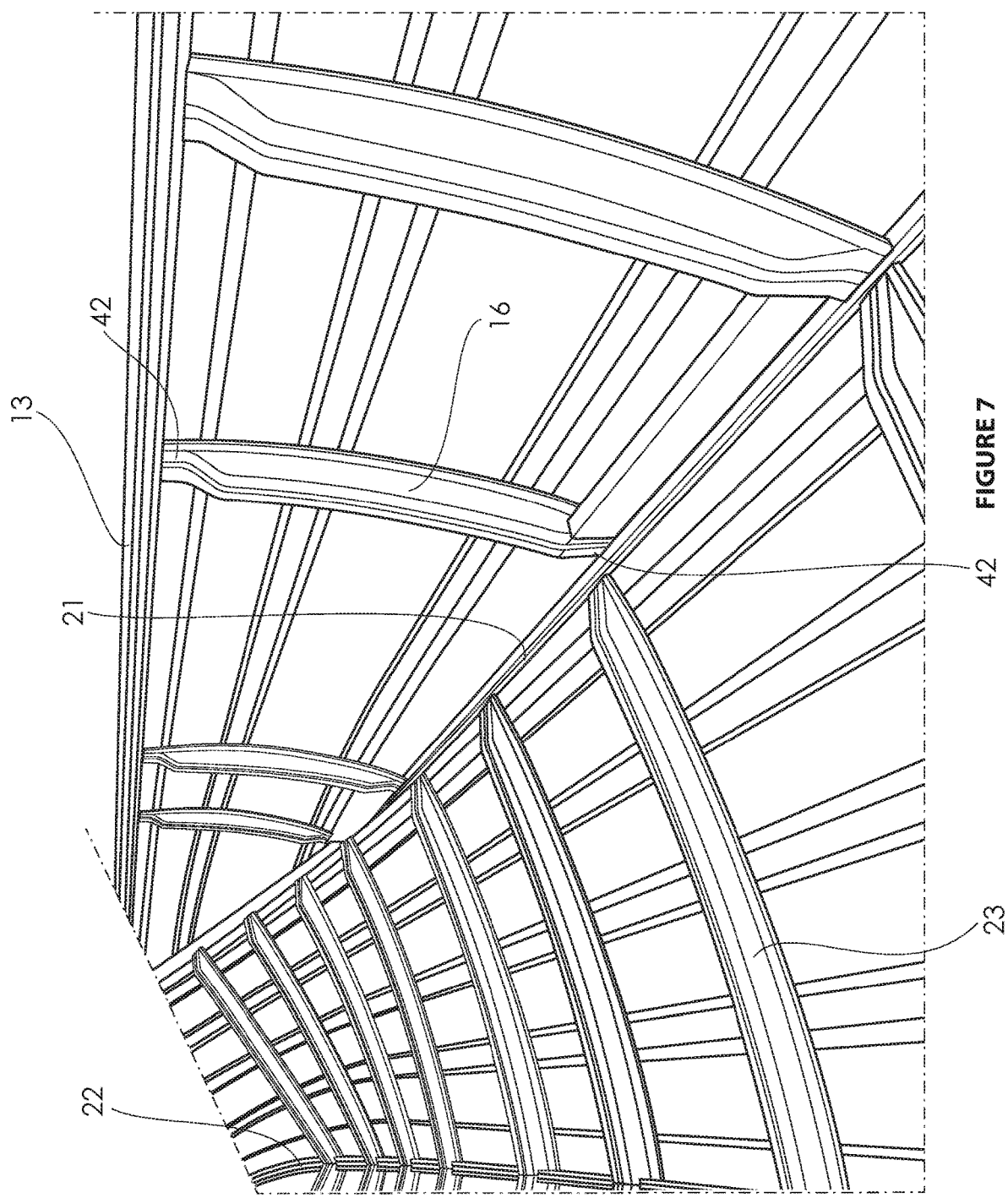
FIG. 7 is a perspective view of a part of a boat hull showing components with track systems.

FIG. 7 shows an enlarged view of a part of the boat hull showing the ribs 16, 23, chines 21, keel 22 and gunwale 13 with integrated track systems. The track systems comprise channels extending longitudinally through these components. The channel openings of the track systems integrated into the ribs 16, 23, chines 21 and keel 22 face the inside of the boat hull. The gunwales 13 can have the channel openings facing upwards, outwards, inwards and/or downwards.

Figure 8:
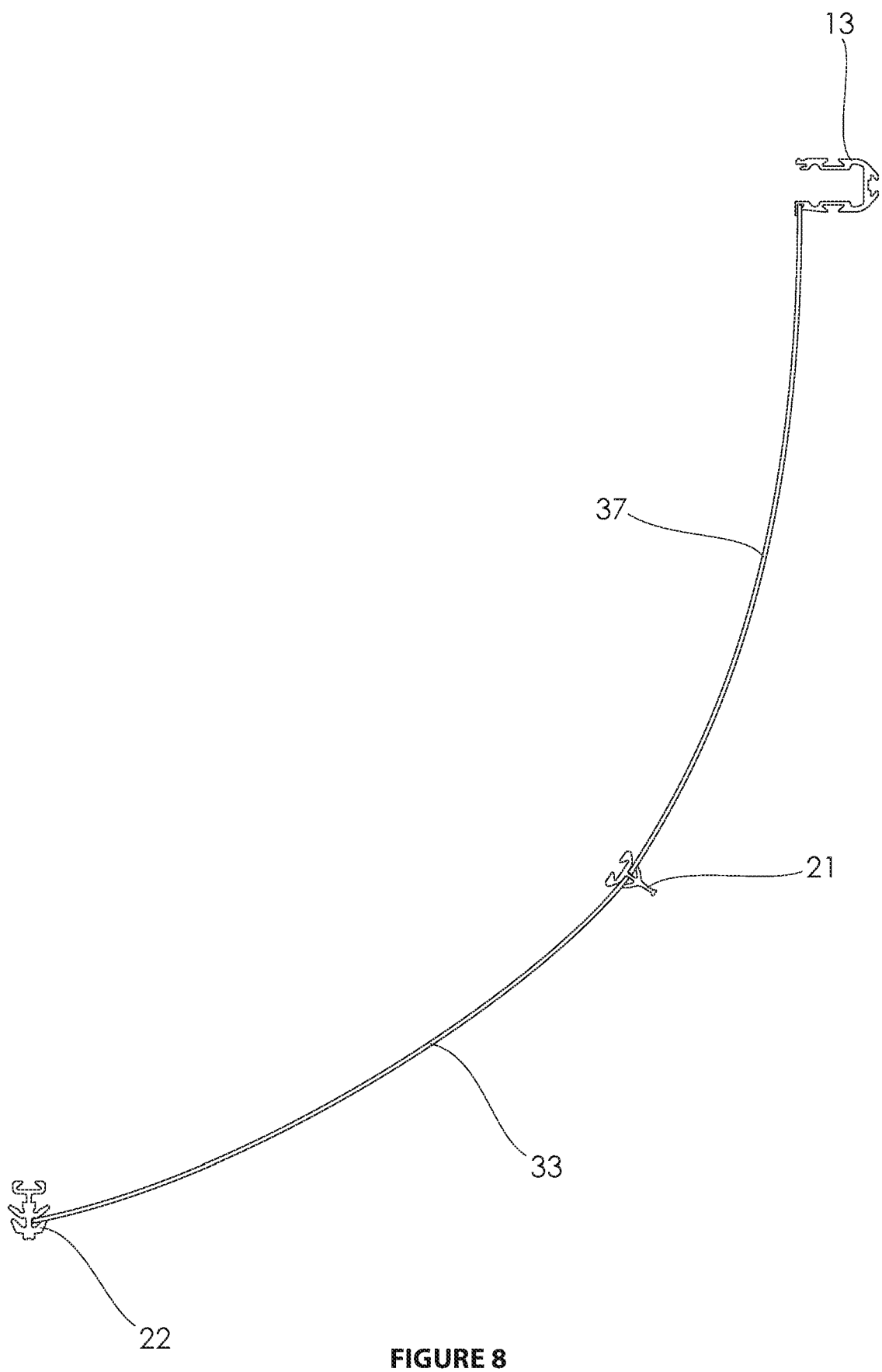
FIGS. 8 and 9 are schematic diagrams showing a partial cross section of a boat hull with track systems integrated with the gunwale, chine and keel.
Figure 9:
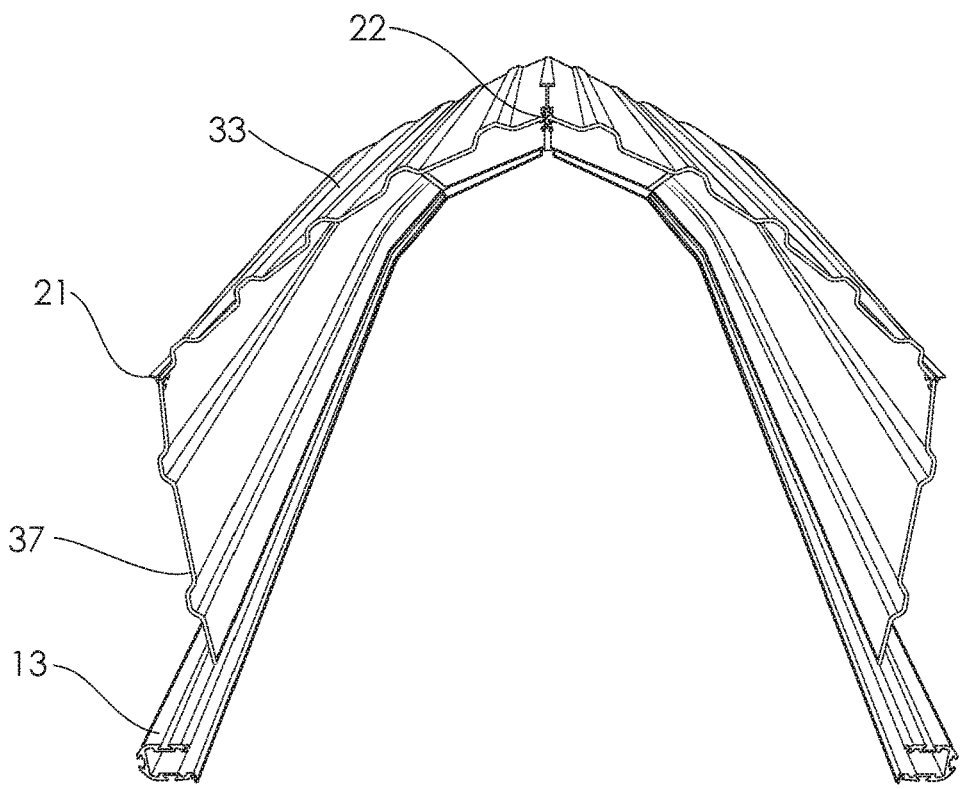

FIGS. 8 and 9 show a partial cross section and a perspective, cutaway view of a boat hull with track systems integrated with the gunwale 13, chines 21 and keel 22.

FIGS. 3 to 6 show the gunwale 13, chine 21, keel 22 and rib 16, 23, respectively, with integrated track systems 29, 30, 31, 34, 38, 41. To minimise the types of fasteners and other components for mounting accessories, it is desirable that the track systems integrated into each of these components of the boat hull 100 are sized and shaped similarly so they can receive same fasteners.

Figure 3:
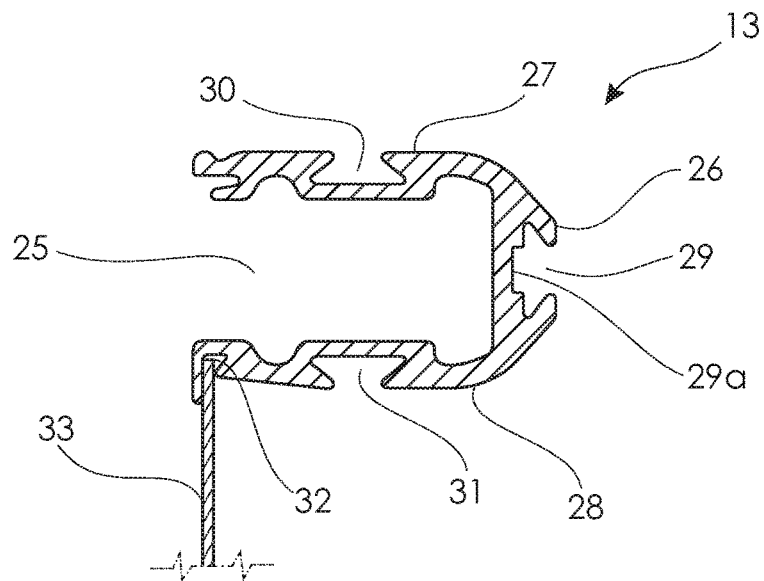
FIG. 3 is a schematic diagram of a track system integrated with the gunwale of a boat.

Referring to FIGS. 2 and 3, the gunwale members 13 are mounted around the outer perimeter of the boat hull 100. Each gunwale member 13 has a generally C-shaped recess 25. The gunwale member 13 has channels for three track systems 29, 30, 31. The channels of the track systems 29, 30 are located in a side surface 26 and a top surface 27 which define the external side of the boat hull 100. The channel for the track system 31 is located in a bottom surface 28 of the gunwale 13. The gunwale member 13 also has a slot 32 adapted to receive the top edge of the upper plate 33 of the boat hull 100 for welding the gunwale member 13 to the boat hull 100. The channel openings of the track systems 29, 30, 31 face outwardly towards the outside of the boat hull 100, upward and downward on the outer side of the boat hull 100, respectively.

Figure 4:
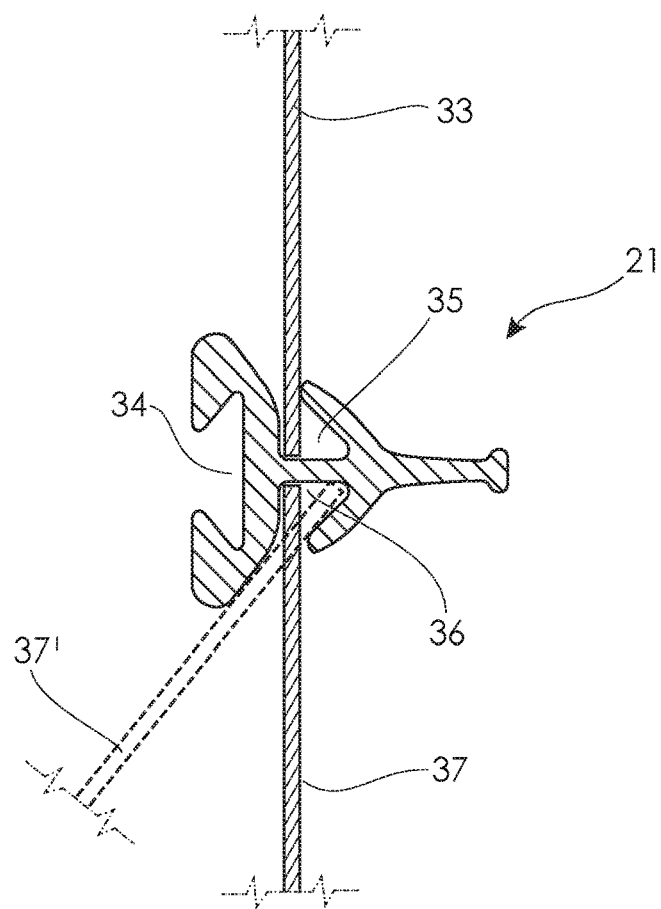
FIG. 4 is a schematic diagram of a track system integrated with a chine of a boat.

Referring to FIG. 4, the chine 21 includes a track system 34. The upper and lower edges of the chine 21 include longitudinally extending slots 35, 36 adapted to receive the bottom edge of the upper plate 33 and the top edge of the lower plate 37 for welding to form the boat hull 100. The channel opening of the track system 34 faces toward the inside space of the boat hull 100. The slots 35, 36 have narrow openings but are have wider spaces inside such that the slots 35, 36 can receive the plates 33, 37 at various angles, such as shown with plate 37 and plate 37' in FIG. 4. The chine 21 can therefore be adapted for boat hulls 100 of varying profiles.

Figure 5:
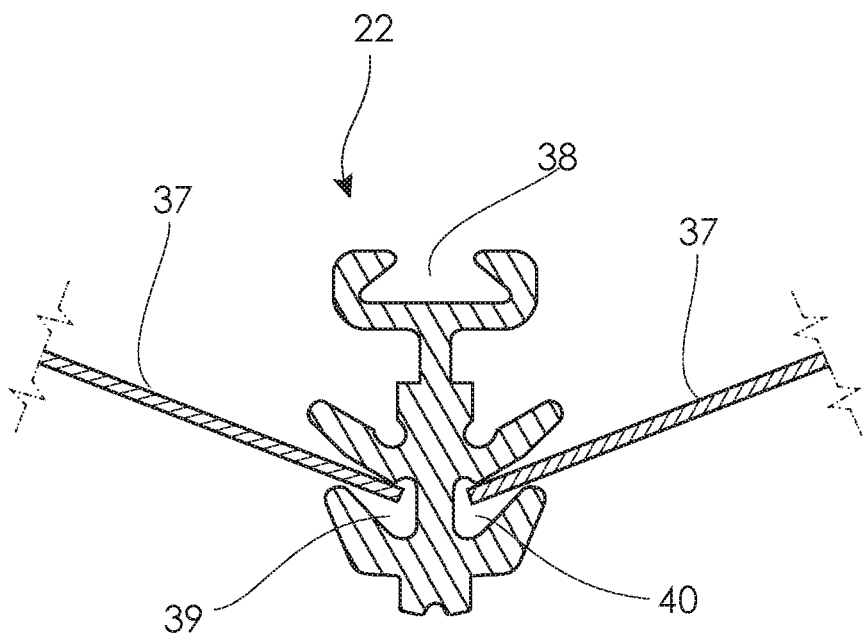
FIG. 5 is a schematic diagram of a track system integrated with a keel of a boat.

Referring to FIG. 5, the central keel 22 includes a track system 38. The two wings of the central keel 22 include longitudinally extending slots 39, 40 adapted to receive the bottom edges of the lower plates 37 for welding to form the boat hull 100. The channel opening of the track system 38 faces upwardly toward the inside space of the boat hull 100. The slots 39, 40 have narrow openings but have wider internal space to enable receiving the plates 37 at various angles. The keel 22 can therefore be adapted for boat hulls 100 of varying profiles.

Figure 6:
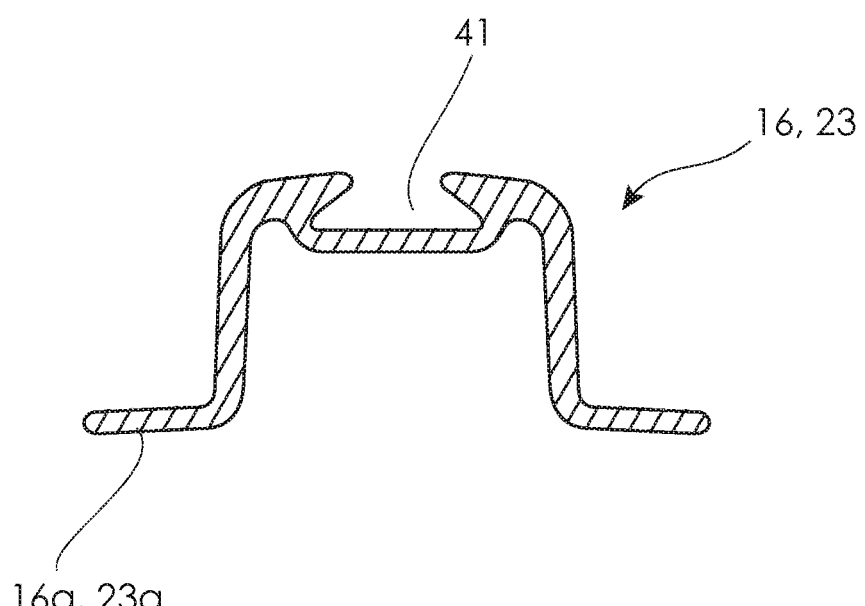
FIG. 6 is a schematic diagram of a track system integrated with a rib of a boat.

Referring to FIG. 6, the rib 16, 23 is generally hat-shaped and includes a track system 41. The longitudinal ends of the rib 16, 23, for example as denoted 42 in FIG. 7, can be pressed to increase the contacting surface area and to thereby improve the welding strength with other components such as the chine 21, keel 22 and gunwale 13. The rib 16, 23 can be welded to other components of the boat hull 100 via all or parts of the wings 16a, 23a. Multiple ribs with track systems can be adapted in the boat hull 100 to form load-bearing and pressure-absorbing structural skeleton mechanism for the boat hull 100. The channel opening of the track system 41 faces inward towards the inside space of the boat hull 100.

Figure 18:
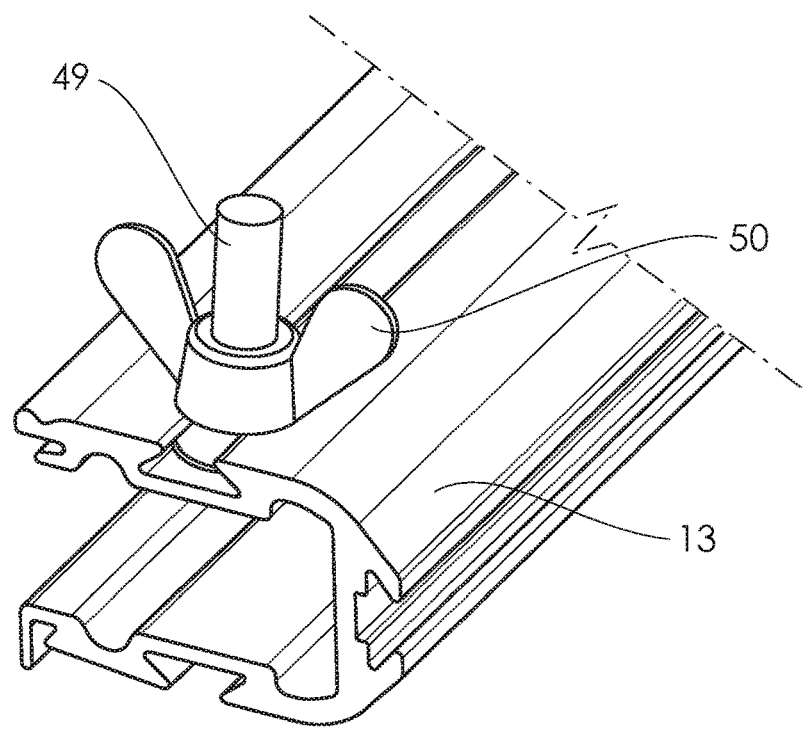
FIG. 18 shows a schematic diagram of a track system in use with a plow bolt and a nut as a fastener.
Figure 19:
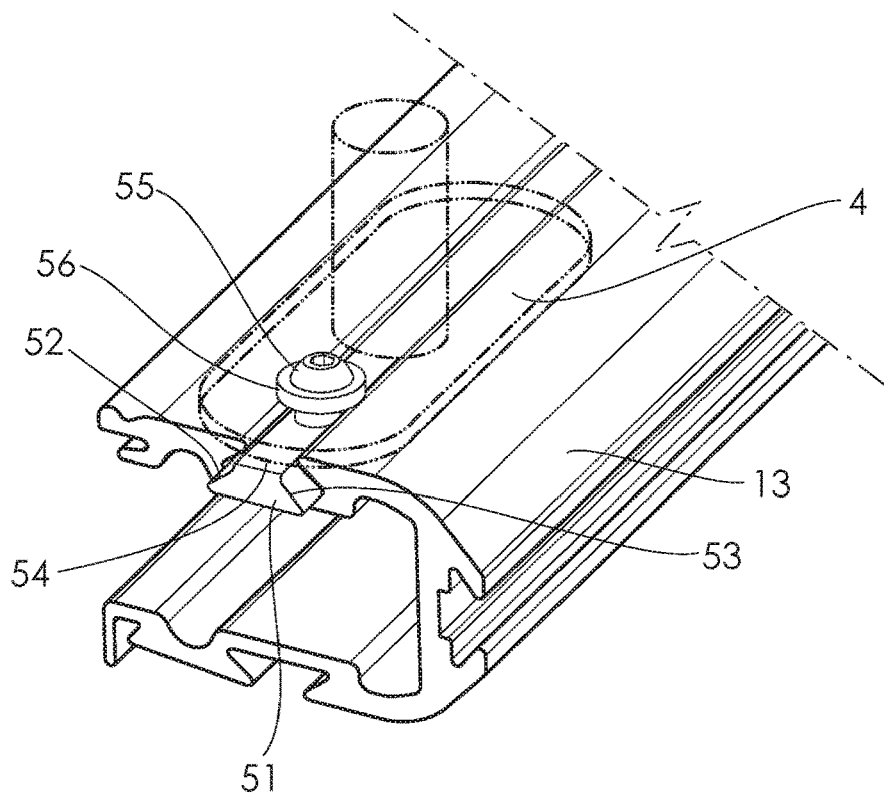
FIG. 19 shows a schematic diagram of the track system in use with a channel nut and a bolt as a fastener.

Advantageously, all track systems of the boat hull 100 have dimensions and shapes adapted to engage with the same fasteners for flexibility of layout designs. In the embodiment, all of the track systems have channels with a substantially same shape, with the exception of track system 29 with a groove 29a into a wall opposite the channel opening. To illustrate the engagement mechanism of the track systems with fasteners, FIG. 18 shows an example of the track system 30 in use with a plow bolt 49 and a nut 50 as a fastener. FIG. 19 shows an example of the engagement mechanism of the track system 30 with a channel nut 51, a bolt 55 and a washer 56 as a fastener.

The track systems 29, 30, 31, 34, 38, 41 each has a channel opening located on a surface of the extruded component which forms the gunwale 13, chine 21, keel 22 and rib 16, 23, respectively. The channel opening is in communication with the channel body. The width of the channel tapers outwardly within the extruded component, thereby having a cross-sectional profile generally in the form of an isosceles trapezoid. The channel 29 has an additional rectangular groove 29a located beneath the base side of the trapezoid, that is, the longer one of the parallel sides of the trapezoid. Furthermore, the upper side of the trapezoid, being the shorter of the two parallel sides of the trapezoid, defines the longitudinal channel opening.

The tapering cross-sectional profile of the channels 29, 30, 31, 34, 38, 41 enables countersunk head plow bolts 49 to be inserted in the channels, such that the threaded stem of the bolt 49 projects from the channel opening, as depicted schematically in FIG. 18. In this arrangement, the tapering, countersunk head of the plow bolt 49 abuts against the tapering walls of the channel, and prevents the bolt 49 from being removed along its longitudinal axis. For example, when a wing nut 50 is fastened to the thread of the plow bolt 49, the wing nut 50 applies an axial force to the stem of the plow bolt 49, thereby frictionally isolating the plow bolt 49 relative to the channel. In contrast, when the wing nut 50 is released, the plow bolt 49 is free to slide longitudinally within the channel. Generally, the plow bolt 49 can only be inserted into and removed from the channel at each of the ends of the channel or through sections of channel openings that are widened to allow the head of the plow bolt 49 to pass through.

Referring to FIG. 19, a channel nut 51 can also be used with the channel. The channel nut 51 has a cross sectional profile in the form of an isosceles trapezoid, having angled faces 52, 53. The upper surface 54 of the channel nut 51 includes a threaded hole adapted to receive a bolt 55 with a washer 56 to provide a clamping force. A ring bolt could be used. In the example of FIG. 19, the fastener is used to mount a handrail 4 by inserting the bolt 55 through a hole in a bottom plate of the handrail 4 and fastening the bolt 55 with the channel nut 51 located in the channel of the track system 30 in the gunwale 13. The channel nut 51 can be inserted into and removed from the channel at the ends of the channel or through widened sections of the channel openings, and can slide longitudinally along the channel to a desired location.

As described above, the channel can receive either the head of a plow bolt 49, or a channel nut 51. This provides at least two different alternatives for mounting components to the channels. This enables typical anchor accessories to be mounted at selective and moveable locations along the length of the extruded components forming the gunwale 13, chines 21, keel 22 and ribs 16, 23.

FIGS. 10 to 17 show the track systems in use with various accessories mounted.

Figure 10:
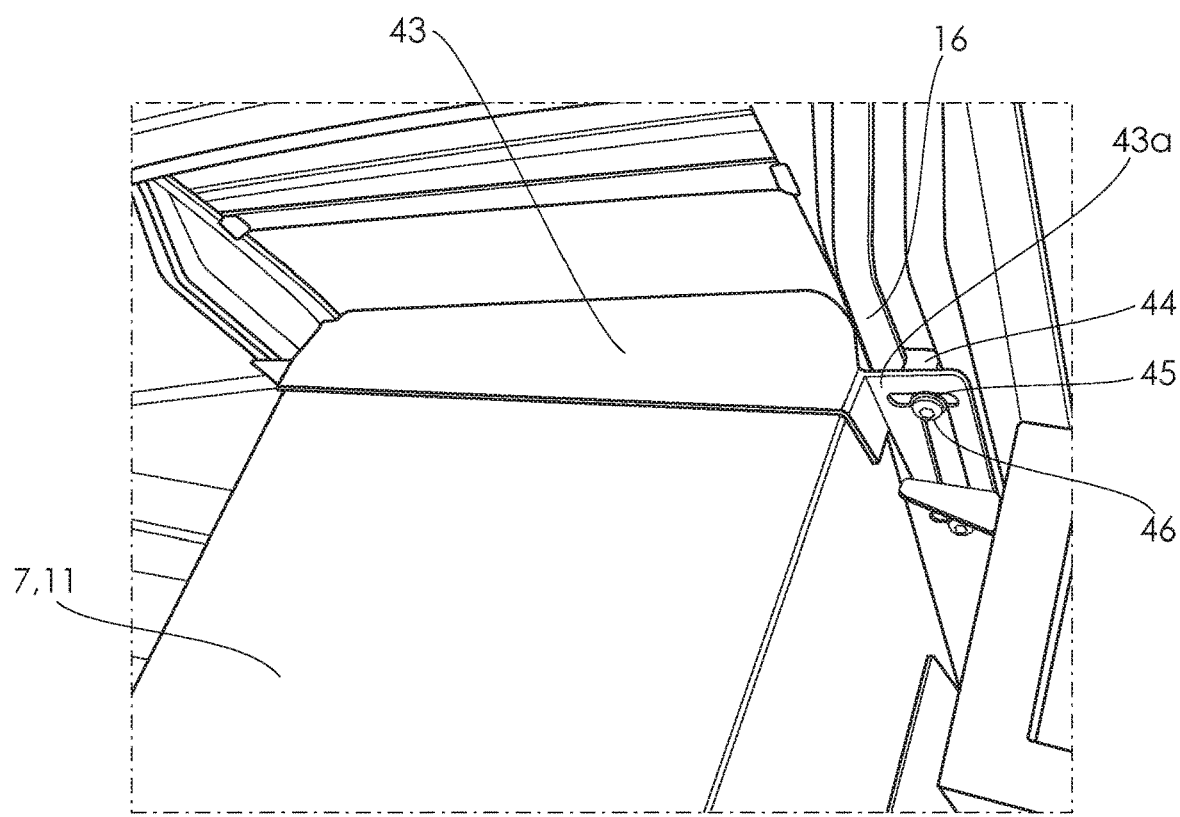
FIGS. 10 to 17 show the track system in use with various accessories mounted.

In FIG. 10, a thwart seat 7, 11 is mounted on the boat hull 100 using a top securing plate 43 with side flanges 43a that are secured to the side ribs 16 with channel nuts 44, washers 45 and bolts 46. the bolts 46 and nuts 44 provide a clamping force onto the rib profile to provide load security. The other end of the thwart seat 7, 11 is also held in place with a top securing plate 43 secured to the side ribs 16 on the opposing side of the boat hull 100. Additionally, or alternatively, the securing plate may be secured to the chines 21 to install the thwart seat 7, 11. The method can also be applied to various other accessories and equipment, especially those spanning the width of the boat hull 100, and is not limited to thwart seats.

Figure 11A:
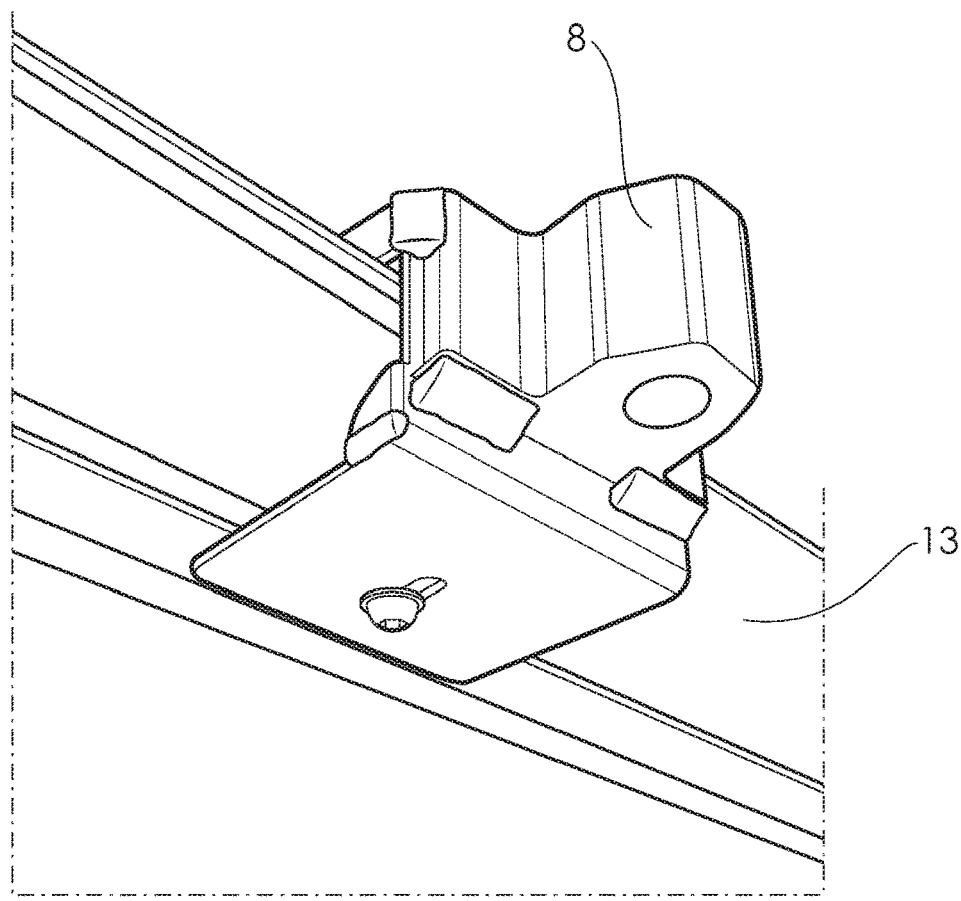
Figure 11B:
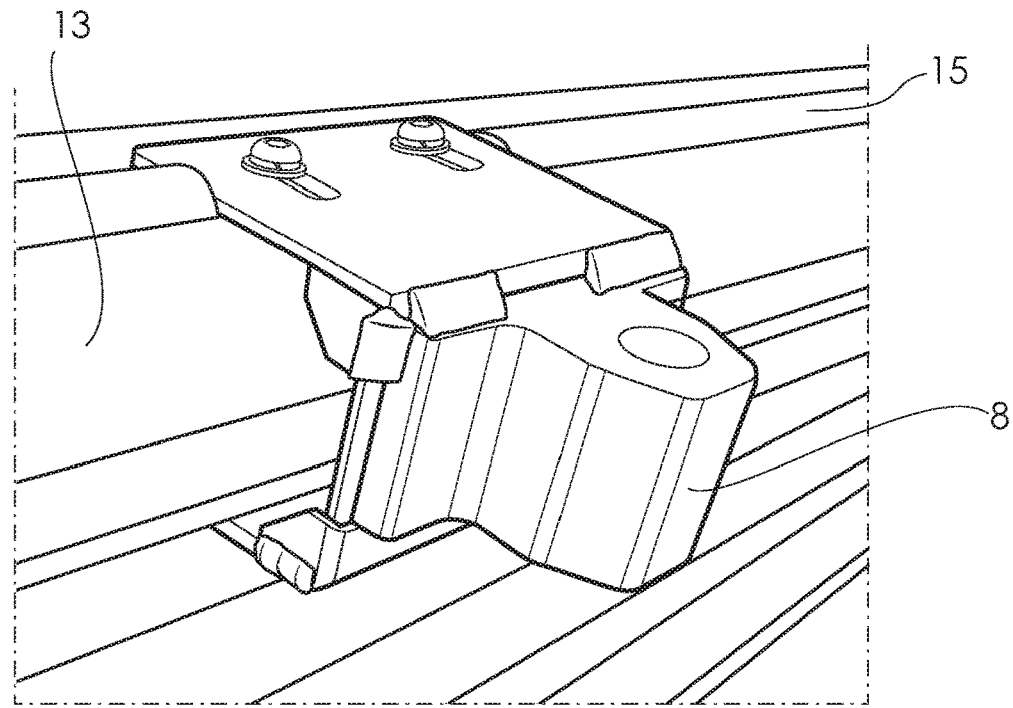

In FIGS. 11A and 11B, a row lock socket 8 is mounted onto the gunwale 13 using a similar fastening method. The bottom side of the row lock socket 8 is secured to the downward-facing track system 31 with one fastener (FIG. 11A) and the top of a U-shaped row lock socket 8 is secured to the upward-facing track system 30 using two sets of fasteners (FIG. 11B).

Figure 12A:
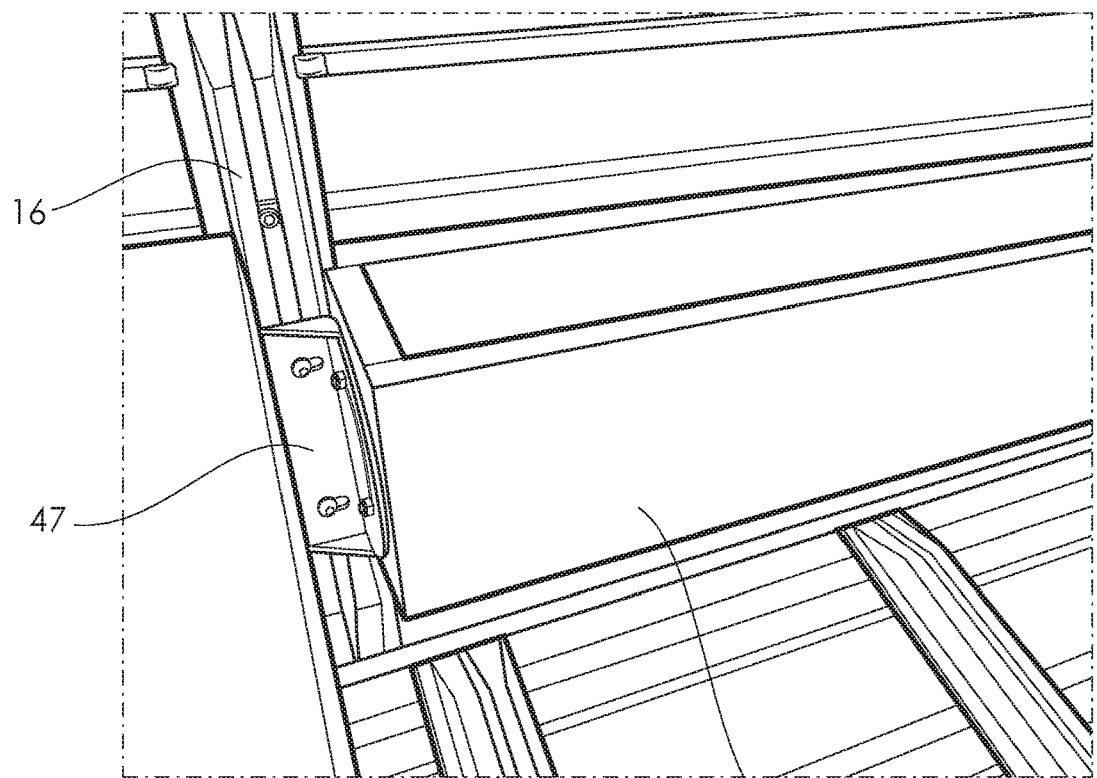
Figure 12B:
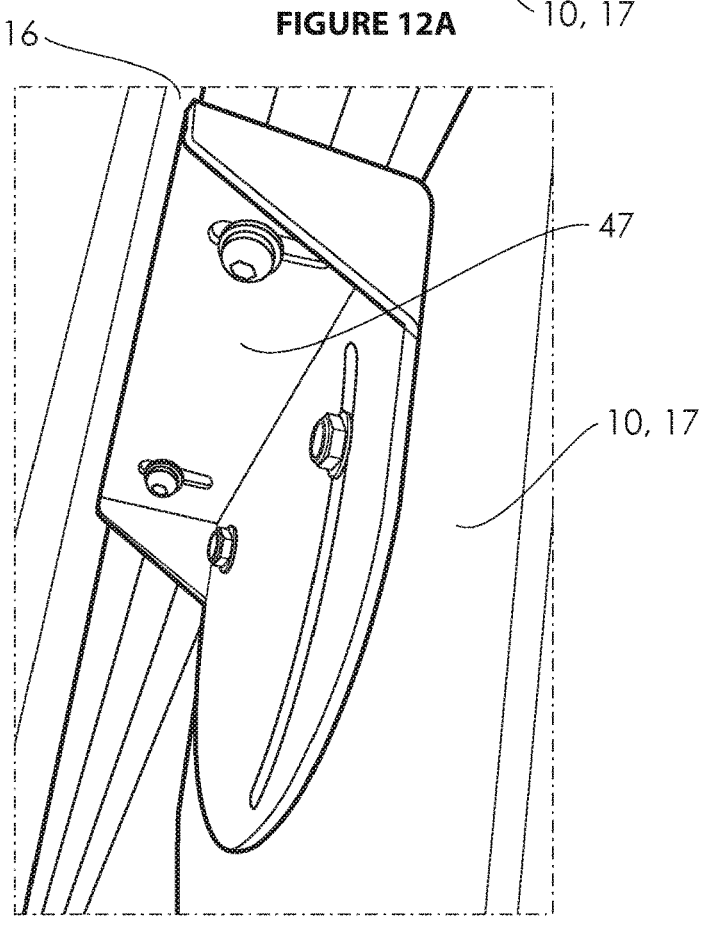

In FIGS. 12A and 12B, a side storage pocket 10, 17 is mounted onto the side ribs 16 via adapting plates 47 which are secured with fasteners to the side ribs 16 and the storage pocket 10, 17.

Figure 13:
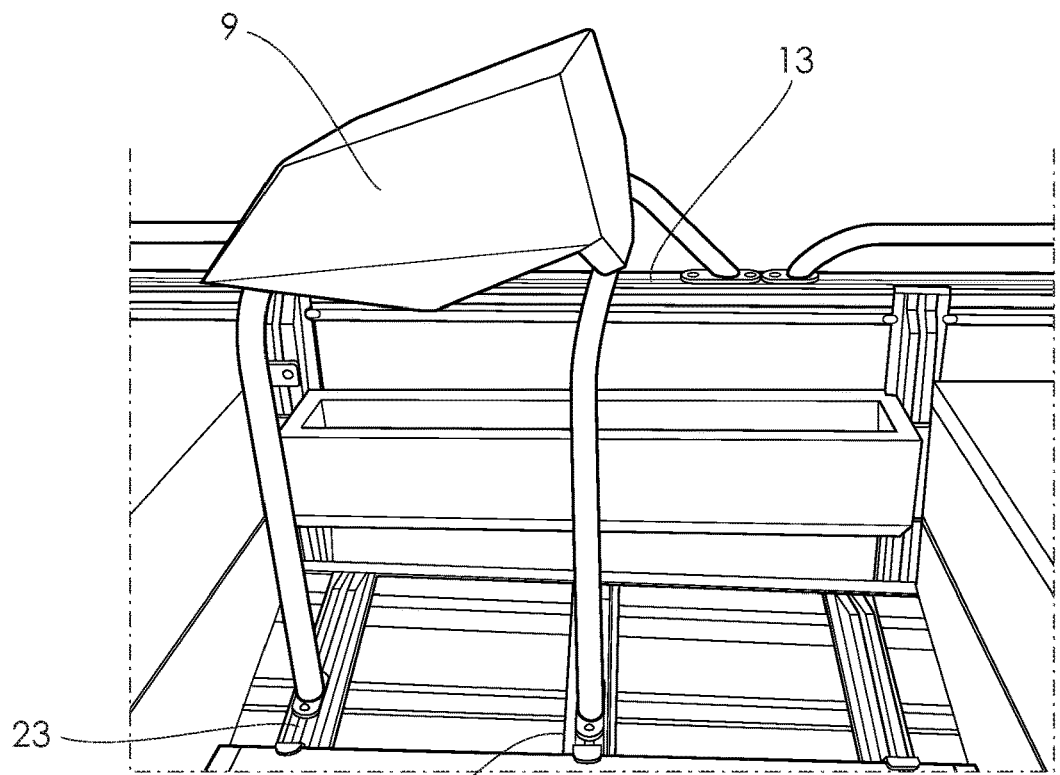

In FIG. 13, a steering console 9 is mounted on the boat hull 100 by securing the legs of the console to the bottom ribs 23 and the side arms of the console to the upward-facing track system 30 on the gunwale 13.

Figure 14:
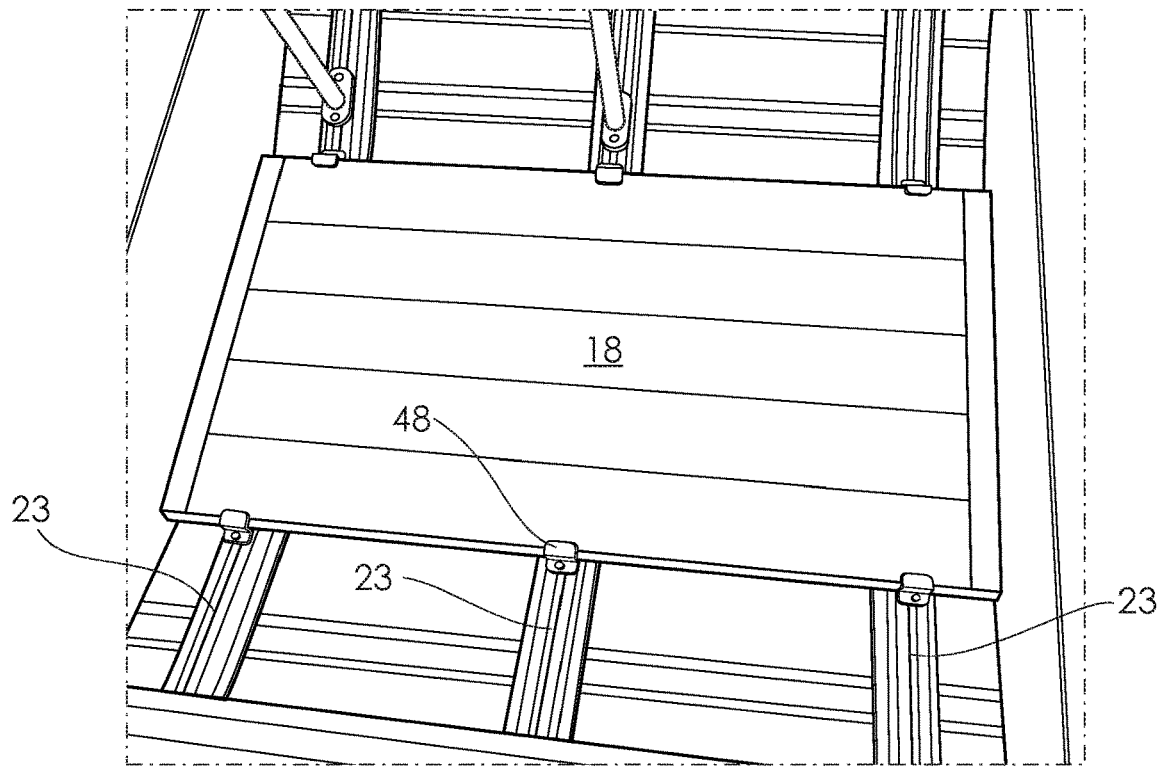

In FIG. 14, a boat floor deck 18 is mounted on the boat hull 100 with securing bracket 48 which are secured to the bottom ribs 23.

Figure 15:
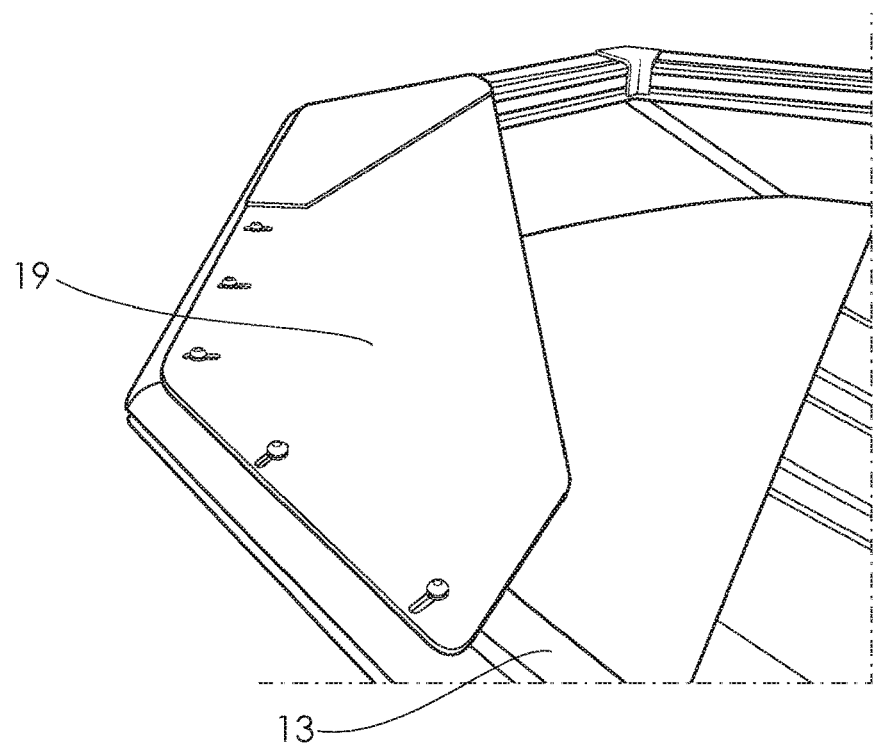

In FIG. 15, a trolley motor bracket 19 is mounted onto the gunwale 13 with fasteners inserted through holes in the bracket 19.

Figure 16:
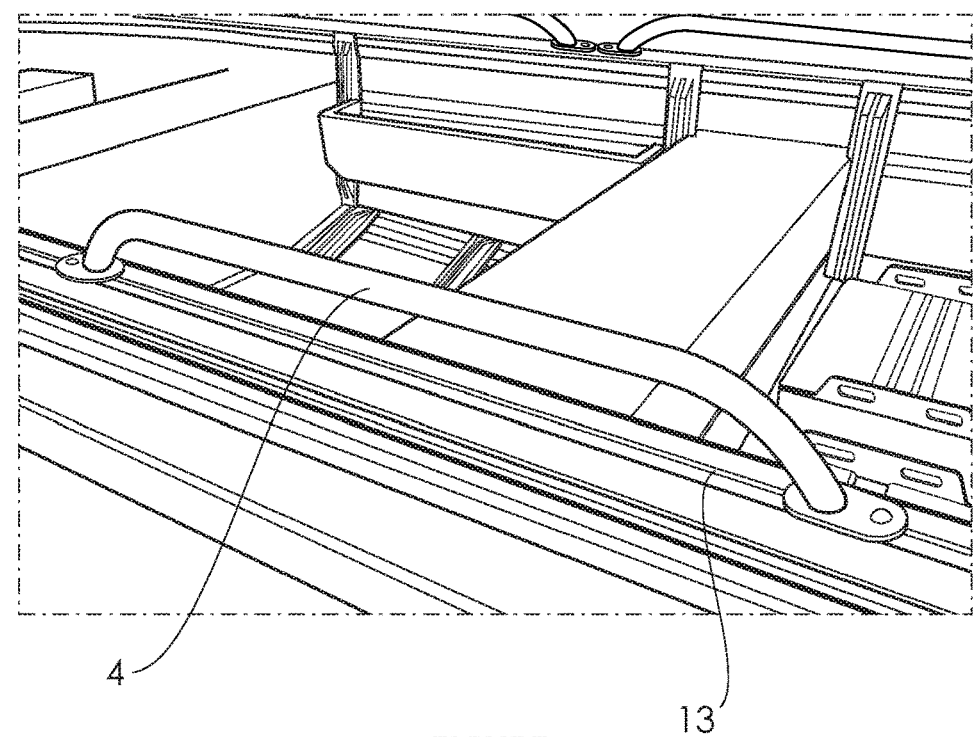

In FIG. 16, a handrail 4 is mounted onto the gunwale 13 by securing the legs of the handrail 4 onto the upward-facing track system 30 of the gunwale 13. FIG. 19 shows an enlarged view of one of the legs of the handrail 4 secured onto the track system 30.

Figure 17:
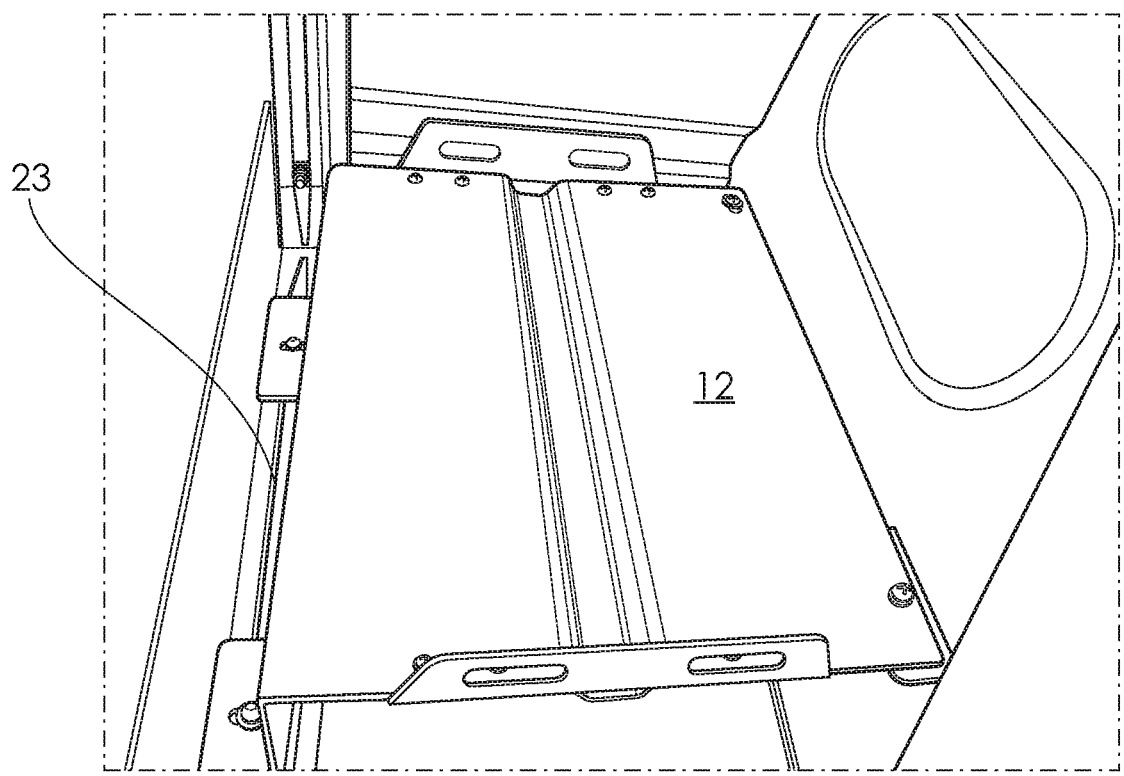

In FIG. 17, a fuel/battery stand 12 is mounted onto the boat hull 100 by securing flanged portions of the stand 12 to the bottom rib 23.

Figure 20:
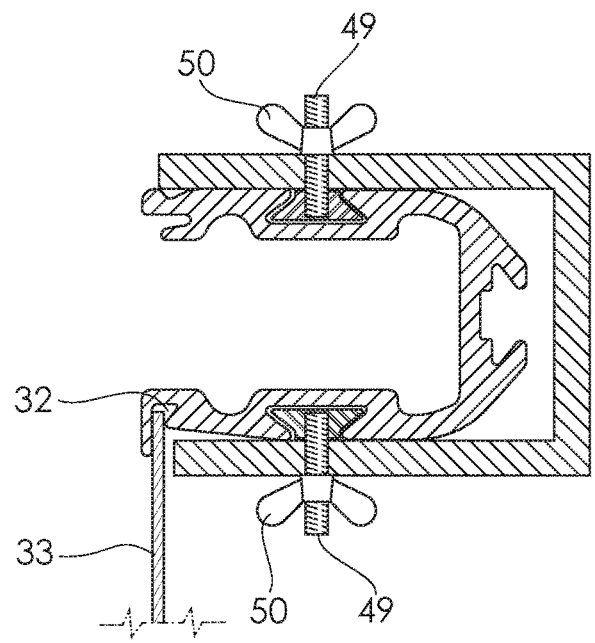
FIGS. 20 and 21 show schematic diagrams of the track system in use with accessories mounted using fasteners.
Figure 21:
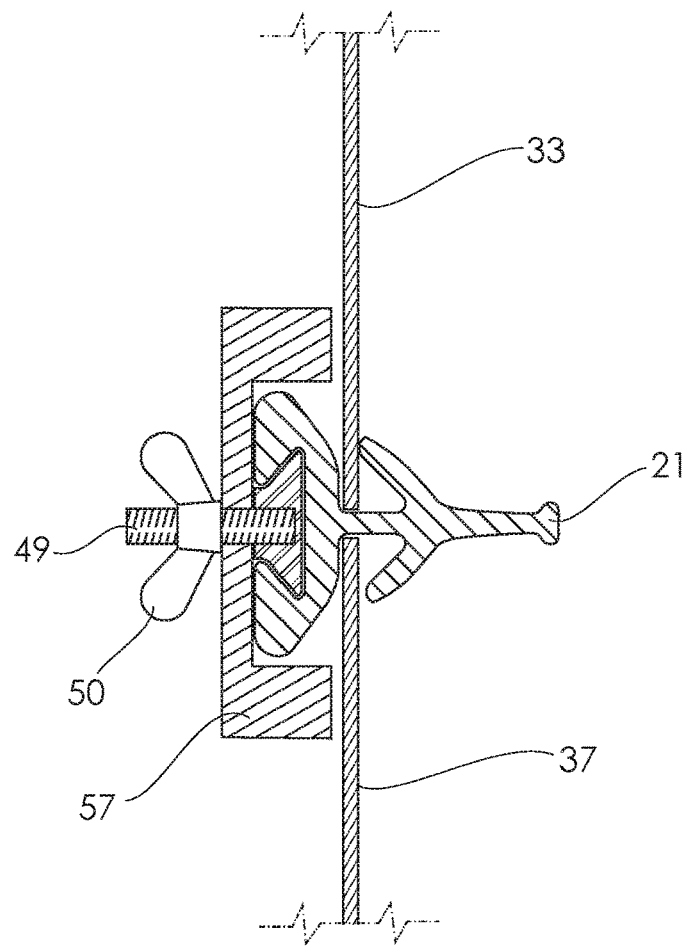

FIGS. 20 and 21 show schematic diagrams of the track system in use with accessories mounted using fasteners. FIG. 20 is a cross-sectional view of the gunwale 13 with an accessory, such as a row lock socket 8 also shown in FIG.

11, secured onto it in a wrap-around configuration with plow bolts 49 and nuts 50. FIG. 21 is a cross-sectional view of the chine 21 with an accessory 57 secured onto it with a plow bolt 49 and a nut 50. The securing portion of the accessory or the securing member can be of various shapes, such as flat against the surface with the channel opening and a wrap-around shape surrounding the extruded component with the track system.

Advantageously, the boat hull 100 takes advantage of partial or complete construction of the boat hull from aluminium extrusion profiles. The track systems can be incorporated into the profile of the aluminium extrusion to minimise joints and cost.

The boat hull 100 can be made available in various lengths and beams to suit different voyage zones and various recreational and commercial applications. The boat hull 100 can also be adopted into different hull shapes.

The integration of the track systems in the form of the channels permits the mounting of boat internal fit-out parts and boat accessories of varying sizes and lengths in numerous locations. This provides the ability to secure various boat parts, including but not limited to, boat floor board decks, boat foredeck, boat cockpit, boat steering console, boat thwart seats, boat longitudinal seats, boat driver and passenger seats, boat galley, boat under deck transverse and longitudinal reinforcement members, boat windscreen, boat upholstery parts, boat storage parts, boat fuel tank, boat grey water tank, boat inbound engine in a flexible manner that suits the needs of the customers and stability of the boat hull.

The track system disclosed herein can improve the flexibility of boat layout without compromising the structural integrity of the boat hull, by removing the process of drilling through structural material or components or process of fastening, welding, gluing, or moulding.

According to one or more of the embodiments of track systems disclosed herein, it is possible to significantly enhance the boat manufacturing efficiency through the modular components manufacturing method as well as reduce the labour cost of constructing the boat. This becomes possible due to decreased reliance on higher skills that were traditionally required and time-consuming process such as welding, structural glue adhering, and moulding.

Further, it is also possible to enhance the life cycle of the boat as the current and future owner will have opportunity through the track systems to re-arrange the boat internal fit-out or able to affix new parts or accessories onto the boat hull to suit their individual needs.

Although the invention has been described with reference to specific examples, it will be appreciated by those skilled in the art that the invention may be embodied in many other forms.

What is claimed is:

1. A boat hull having a keel, chines, side ribs, and bottom ribs comprising
    a main body having one or more track systems integral with a main body of the boat hull, each track system having a longitudinally extending channel including:
        a longitudinally extending channel body; and
        a longitudinally extending channel opening in communication with the longitudinally extending channel body,
        one or more plates forming the main body of the boat hull, the plates being welded with or fastened onto one or more of the keel, chines, side ribs, or bottom ribs,
        wherein the channel body is wider in cross-section than the longitudinally extending channel opening,
        wherein the longitudinally extending channel body is adapted to receive a fastener which has a portion that is wider in cross section than the longitudinally extending channel opening, thereby preventing the fastener from being withdrawn from the longitudinally extending channel body through the longitudinally extending channel opening,
        wherein the fastener can be selectively secured to each track system at a selected longitudinal position; and
        wherein at least one of the keel and the chines has a longitudinally extending slot for receiving an edge of one of the plates, the slot having an internal space that is wider than an opening to enable receiving the edge of the plate at various angles.

2. The boat hull according to claim 1, wherein the one or more track systems are each integral with a corresponding gunwale member of the main body of the boat hull.

3. The boat hull according to claim 2, wherein the one or more track systems each extends along the corresponding gunwale member, the longitudinally extending channel opening facing upwards, sideways towards an inside of the boat hull, sideways towards an outside of the boat hull, or downwards.

4. The boat hull according to claim 3, wherein the boat hull has two or more track systems integral with each corresponding gunwale member and has a corresponding longitudinally extending channel opening towards different directions and adapted to secure an accessory to the boat hull by each receiving a fastener.

5. The boat hull according to claim 4, wherein each of said two or more track systems is welded or fastened onto the corresponding gunwale member.

6. The boat hull according to claim 1, wherein the one or more track systems are each integral with and extends along one or more of the keel, chines and ribs of the main body of the boat hull.

7. The boat hull according to claim 6, wherein the longitudinally extending channel opening of each of the one or more track systems opens towards an inside space of the boat hull.

8. The boat hull according to claim 6, wherein each of the one or more track systems is integrally formed with one of the keel, the chines, and the ribs.

9. The boat hull according to claim 1, wherein each said longitudinally extending channel body has a cross-sectional profile generally in a form of an isosceles trapezoid, a short side of two parallel sides of the isosceles trapezoid defining the longitudinally extending channel opening.

10. The boat hull according to claim 9, wherein each said longitudinally extending channel body has a rectangular groove into a longer side of the two parallel sides of the isosceles trapezoid.

11. The boat hull according to claim 1, wherein each of said one or more track systems has an engagement mechanism adapted to be selectively isolated longitudinally relative to the longitudinally extending channel.

12. The boat hull according to claim 11, wherein the engagement mechanism comprises a plow bolt having a head portion and a threaded stem portion, wherein the head portion is located in the longitudinally extending channel body and slides along the longitudinally extending channel without coming out through the longitudinally extending channel opening, and the threaded stem portion is adapted to extend through the longitudinally extending channel opening to engage with a nut to act as the fastener.

13. The boat hull according to claim 11, wherein the engagement mechanism comprises a channel nut located in the longitudinally extending channel body and slides along the channel without coming out through the longitudinally extending channel opening, the channel nut having a threaded hole adapted to receive a bolt to extend through the longitudinally extending channel opening such that the longitudinally extending channel nut and the bolt function as the fastener.

\* \* \* \* \*